(12) United States Patent
O'Brien et al.

(10) Patent No.: US 8,318,011 B2
(45) Date of Patent: Nov. 27, 2012

(54) PORTABLE DRINKING WATER PURIFICATION DEVICE

(75) Inventors: Paul W. O'Brien, Tunkhannock, PA (US); Mogens Engel, Tunkhannock, PA (US)

(73) Assignee: Miracle Straw Corporation, Inc., Nicholson, PA (US)

( * ) Notice: Subject to any disclaimer, the term of this patent is extended or adjusted under 35 U.S.C. 154(b) by 319 days.

(21) Appl. No.: 12/580,192

(22) Filed: Oct. 15, 2009

(65) Prior Publication Data

US 2010/0102002 A1 Apr. 29, 2010

Related U.S. Application Data

(60) Provisional application No. 61/105,587, filed on Oct. 15, 2008, provisional application No. 61/227,428, filed on Jul. 21, 2009.

(51) Int. Cl.
- *B01D 35/00* (2006.01)
- *B01D 29/62* (2006.01)
- *B01D 29/88* (2006.01)
- *B01D 35/22* (2006.01)
- *C02F 9/00* (2006.01)

(52) U.S. Cl. .......... 210/200; 210/94; 210/106; 210/108; 210/117; 210/136; 210/416.3; 210/236; 210/238; 210/258; 210/335; 210/398

(58) Field of Classification Search .......... None
See application file for complete search history.

(56) References Cited

U.S. PATENT DOCUMENTS

| | | | |
|---|---|---|---|
| 1,000,332 A | 8/1911 | Dyer | |
| 1,386,450 A | 8/1921 | Woster | |
| 3,608,736 A | 9/1971 | Wong | |
| 3,870,639 A | 3/1975 | Moore et al. | |
| 3,932,277 A | 1/1976 | McDermott et al. | |
| 4,151,092 A * | 4/1979 | Grimm et al. | 210/256 |
| 4,298,475 A | 11/1981 | Gartner | |
| 4,477,347 A | 10/1984 | Sylva | |
| 4,529,511 A | 7/1985 | Breeden et al. | |
| 4,632,757 A | 12/1986 | Rosenberg | |
| 4,643,981 A | 2/1987 | Card | |
| 4,717,476 A | 1/1988 | Scott | |
| 4,769,143 A | 9/1988 | Deutsch et al. | |
| 4,800,018 A | 1/1989 | Moser | |
| 4,816,149 A | 3/1989 | Wekell | |
| 4,828,698 A | 5/1989 | Jewell et al. | |

(Continued)

FOREIGN PATENT DOCUMENTS

JP 60122016 6/1985

(Continued)

*Primary Examiner* — Benjamin Kurtz
(74) *Attorney, Agent, or Firm* — Charles A. Wilkinson; Charles H. Wilkinson

(57) ABSTRACT

A portable water disinfecting and purification apparatus comprising a first chamber into which water to be purified may be drawn by suction or negative pressure, a second chamber into which the water from the first chamber can be forced by a pumping action or positive pressure, whereby the water is initially passed across a pre-filter secured over the inlet to the first chamber and having a very small pore size and an inner cavity in which a disinfecting agent is place to filters most contaminants before the water is drawn into said filtering device, and once in the first holding chamber the water is isolated and may be further treated with a disinfectant agent, and then is passed though at least additional filtering substance including an activated carbon or nano-filter.

20 Claims, 8 Drawing Sheets

U.S. PATENT DOCUMENTS

| | | | |
|---|---|---|---|
| 4,832,850 | A | 5/1989 | Cais et al. |
| 4,832,851 | A | 5/1989 | Bowers et al. |
| 4,859,336 | A | 8/1989 | Savas et al. |
| 4,891,134 | A | 1/1990 | Vcelka |
| 4,962,044 | A | 10/1990 | Knesel, Jr. et al. |
| 4,995,976 | A | 2/1991 | Vermes et al. |
| 5,045,195 | A | 9/1991 | Spangrud et al. |
| 5,078,876 | A | 1/1992 | Whittier et al. |
| 5,106,500 | A | 4/1992 | Hembree et al. |
| 5,120,437 | A | 6/1992 | Williams |
| 5,122,272 | A | 6/1992 | Iana et al. |
| 5,156,335 | A | 10/1992 | Smith et al. |
| 5,156,737 | A | 10/1992 | Iana et al. |
| 5,167,819 | A | 12/1992 | Iana et al. |
| 5,268,093 | A | 12/1993 | Hembree et al. |
| 5,273,649 | A | 12/1993 | Magnusson et al. |
| 5,362,385 | A | 11/1994 | Klegerman et al. |
| 5,366,642 | A | 11/1994 | Platter et al. |
| 5,433,848 | A * | 7/1995 | Platter et al. ............ 210/238 |
| 5,456,831 | A | 10/1995 | Sullivan |
| 5,509,605 | A | 4/1996 | Cripe |
| 5,518,613 | A | 5/1996 | Koczur et al. |
| 5,534,145 | A | 7/1996 | Platter et al. |
| 5,549,816 | A | 8/1996 | Harp et al. |
| 5,569,374 | A | 10/1996 | Williams |
| 5,656,160 | A | 8/1997 | Parise et al. |
| 5,685,980 | A | 11/1997 | Patapoff et al. |
| 5,688,588 | A | 11/1997 | Cotton et al. |
| 5,709,794 | A | 1/1998 | Emmons et al. |
| 5,733,448 | A | 3/1998 | Kaura |
| 5,919,357 | A | 7/1999 | Wilkins et al. |
| 5,928,512 | A | 7/1999 | Hatch et al. |
| 5,981,293 | A | 11/1999 | Charlton |
| 6,010,626 | A | 1/2000 | D'Agostino |
| 6,136,188 | A | 10/2000 | Rajan et al. |
| 6,142,384 | A | 11/2000 | Shafik |
| 6,193,886 | B1 | 2/2001 | Nohren, Jr. |
| 6,200,471 | B1 | 3/2001 | Nohren, Jr. |
| 6,344,146 | B1 * | 2/2002 | Moorehead et al. ......... 210/668 |
| 6,478,956 | B2 | 11/2002 | Kaura |
| 6,569,329 | B1 | 5/2003 | Nohren, Jr. |
| 6,733,669 | B1 | 5/2004 | Crick |
| 6,811,036 | B1 | 11/2004 | Vaiano et al. |
| 6,887,379 | B2 | 5/2005 | Schiltz |
| 6,919,025 | B2 | 7/2005 | Cluff et al. |
| 7,066,336 | B2 | 6/2006 | Keeping et al. |
| 7,226,542 | B2 | 6/2007 | Zemel et al. |
| 7,390,340 | B1 | 6/2008 | Schopf, Jr. |
| 7,402,239 | B2 | 7/2008 | Dorward |
| 7,413,653 | B2 | 8/2008 | Powell |
| 7,438,801 | B2 | 10/2008 | Scaringe |
| 7,476,312 | B2 | 1/2009 | Laing et al. |
| 7,507,338 | B2 | 3/2009 | Bommi et al. |
| 2003/0106851 | A1 | 6/2003 | Tremblay et al. |
| 2004/0040906 | A1 | 3/2004 | Jagtoyen et al. |
| 2004/0144711 | A1 | 7/2004 | Cluff et al. |
| 2005/0035041 | A1 | 2/2005 | Nohren, Jr. et al. |
| 2005/0082320 | A1 | 4/2005 | Anue |
| 2005/0133427 | A1 | 6/2005 | Rinker et al. |
| 2006/0060530 | A1 | 3/2006 | Ali |
| 2006/0124517 | A1 | 6/2006 | Scaringe |
| 2006/0157398 | A1 | 7/2006 | Nohren, Jr. |
| 2007/0163943 | A1 | 7/2007 | Collins et al. |
| 2007/0199875 | A1 | 8/2007 | Moorey et al. |
| 2008/0011662 | A1 | 1/2008 | Milosavljevic et al. |
| 2008/0017565 | A1 | 1/2008 | Yanou et al. |
| 2008/0093303 | A1 | 4/2008 | Tremblay et al. |
| 2008/0197062 | A1 * | 8/2008 | Collins et al. ............ 210/136 |
| 2009/0127178 | A1 | 5/2009 | Kuo |
| 2010/0230344 | A1 * | 9/2010 | Srinivas et al. ............ 210/285 |

FOREIGN PATENT DOCUMENTS

| | | |
|---|---|---|
| WO | WO 82/00256 | 2/1982 |
| WO | WO 91/10494 | 7/1991 |
| WO | WO 97/40906 | 11/1997 |

* cited by examiner

PORTABLE DRINKING WATER PURIFICATION DEVICE

RELATED APPLICATIONS

The present non provisional application claims priority from U.S. Provisional Application No. 61/105,587 filed on Oct. 15, 2008, and U.S. Provisional Application No. 61/227,428, both of which are hereby incorporated by reference in their entirety.

BACKGROUND OF THE INVENTION

1. Field of the Invention

The present invention relates to devices for filtering and purifying water to make such water potable, and more particularly to a portable water filtering and purifying device that can be used to quickly and simply destroy, neutralize or remove very small contaminants and other disease causing elements from such water.

2. Description of Related Art

Contaminated drinking water is one of the world's leading causes of health problems. While poor quality drinking water is encountered on a daily basis by millions throughout the world, and is particularly prevalent in less developed countries, ensuring the safety of a supply of water is also very problematic in developed countries, as well as for soldiers, hikers, international travelers and others. Certain well known waterborne diseases are common in untreated water, caused by microbial agents including protozoan parasites that cause Giardiasis and Cyclosporasis, and *Crytosporidium parvum*, viruses such as the hepatitis A and other viruses, and bacterium such as *E. coli, salmonella typhi* which causes Typhoid fever, *Vibrio cholerae*, and *shigella* species. Symptoms include fever and diarrhea, rashes, cramps, jaundice, liver disease, and other serious diseases, and while in many cases such ailments can be treated if attended to quickly, if not treated can worsen and cause permanent serious conditions as well as death, particularly in the young, elderly, and those having previously compromised immune systems.

In addition to untreated water, treated water supplies may also contain contaminants. While most cities and large towns in developed countries have large piped water systems that continually transport relatively high quality treated water to users, such tap water is only safe to drink if it has been fully treated and disinfected, and if the water system is well operated and maintained. Bottled-water is also increasingly popular, and although usually presumed to be safe by most users, may also be contaminated not only by microbial hazards such as those mentioned above but also by any number of chemical and physical hazards. Possible chemical hazards include lead, arsenic and benzene, while physical hazards include glass chips and metal fragments.

Numerous portable devices for filtering and purifying water in an attempt to render potable a water supply originating from untreated sources such as lakes and streams, or improperly maintained piped water supplies, and other sources are found in the prior art. For example, known are straw-type devices wherein the user places his or her mouth over one end of an elongated casing, and with the other end dangling in a water supply the user will suck inwardly in the same manner as with a conventional straw to cause water to pass into the device and move across one or more filters. A practical problem with such prior art suction filtering and purifying devices is that there is a practical limit to how small the pores in the filter elements, measured in microns and which pore size determines what size particles can pass through the filter, can be made. Although while of course the smaller the pore size of a filter, the more microbial and other contaminants will be removed from a solution upon being passed through the filter, with conventional straw filter devices the pore size of the filter cannot be made too small because it would become too difficult for users to draw water through the filter merely by exerting a manual sucking force. On the other hand, the pore sizes used with prior art manual straw type filter devices are too large to filter out many harmful contaminants, so that such prior art straws are not very effective. For example, while a maximum pore size of 4.0 microns will filter out *Giardia* cysts, a maximum pore size of 0.2 microns is required to filter out all bacteria, which generally have a size of between 0.2 and 10 microns. Many viruses, although typically ranging in size from 0.0004 to 0.1 microns which is too small to be filtered out by most filters, will attach themselves to a larger host bacteria and thus can be removed by removing the larger host bacteria. Another problem encountered with water filters in general is that the smaller the pore size of the filter, the more quickly it will become clogged and rendered ineffective, so that filters with smaller pore sizes must be cleaned or changed more often than filters having larger pore sizes. As a result, such filters must be replaced continually with a new, clean filter, since even if the filter is sterilized by dipping it in a bleach solution or the like to kill harmful parasites and the like, the contaminants although rendered no longer harmful if ingested nevertheless remain in the filter. Clogging filters is particularly problematic in less wealthy countries wherein even a portable filter device could be distributed to every member of the public, whereby everyone having a filtering device can obtain clean and potable water as long as the filter is new, but once the filter is clogged if a replacement filter is not available, or is too expensive, both of which situations are likely, the filter device will be rendered essentially useless.

Still another problem with known portable straw-type water filters is that the water cannot be isolated and treated with specific disinfecting agents for the contact time required by such agent to completely neutralize a contaminant. For example, a disinfectant such as iodine or chlorine must be mixed and in contact with the water for up to several minutes, which could not be accomplished with known portable water filtering devices. Others types of filtering and purifying devices are known, but they are bulky and inconvenient to carry and operate and thus are not truly portable. The present inventors have recognized the numerous problems associated with existing portable water filtering devices, and as a result of a significant amount of experimentation have now developed a portable water filtering and purifying device that can be carried easily in a backpack, bag, shoulder strap, or in a clothing pocket, and that removes almost all contaminants from an untreated water supply. With the present inventors' device, the water is first passed through a pre-filter which removes an unusually large number of contaminants before the water even enters the device. A pumping action is used to create a negative pressure in a first chamber, which pressure draws the contaminated water through the pre-filter, thus allowing the pre-filter to have a much smaller pore size and capture a greater number of contaminants than would otherwise be possible. Another unique feature is that a disinfecting agent such as chlorine may be placed in the pre-filter, which acts as a disinfecting chamber, so that the water is also disinfected once before entering the filter device. The water is then passed into a first chamber, where the water is again isolated and can be further subjected to any desired disinfecting or treatment agent for as long as needed. Then, the treated water supply is forced by a positive pressure out of the holding chamber into another chamber where it is further filtered and made potable. In a preferred embodiment, the water is mixed with a disinfecting agent in the pre-filter stage, a further treatment may be provided in the first chamber, and then the water is forced into the second chamber where it is passed over an activated carbon bed, and then through a nano-filter to provide complete purification. In the second chamber, a containment area in which micronutrients can be added to the water supply may be provided. In addition, the device can be used to clean and unclog the pre-filter by reverse flushing water through the pre-filter so that the device is quickly ready for re-use, thereby making the pre-filter reusable and extending its life more or less indefinitely. Other improvements include the provision of a combination filter cover and drinking cup, and treatment of the pre-filter with a nano silver coating to provide even greater protection against bacteria and viruses prior to entering the device. The present inventors' filter device thus have developed a portable water filter device that either removes or renders harmless virtually all contaminants present in a water supply.

OBJECTS OF THE INVENTION

It is therefore a primary object of the present invention to provide a portable water filtering and purifying device to enable a supply of potable water to be obtained from a contaminated water supply.

It is a further object of the present invention to provide a water filtering and purifying device that can be used to pass water through filters having a very small pore size in order to remove a maximum number of contaminants from the water.

It is a further object of the present invention to provide a water filtering and purifying device in which a water supply can be completely isolated in the device and treated with one or more disinfecting agents for a required time period to fully neutralize and/or destroy contaminants.

It is a still further object of the present invention to provide a water filtering and purifying device wherein the water is first passed through a pre-filter by a negative pressure to remove a large percentage of contaminants, into a holding chamber for isolated treatment, and then into another chamber by a positive pressure force where the water is passed through at least one additional filter or treatment agent and made potable.

It is a still further object of the present invention to provide a portable water purifying device comprised of an outer chamber and an inner chamber that is slidable within said outer chamber, whereby by a pumping action, water is first drawn into said outer chamber where it can be treated and then is forced into said inner chamber where it is passed or physically forced across a filter and purified and then passed out of the inner chamber through a mouth piece.

It is a further object of the present invention to provide a mechanical forced pumping apparatus which can be carried in a person's pocket or other gear like a large pencil or pen or other small container.

It is a further object of the present invention to provide a water filtering device in accordance with the above objects wherein in addition a clogged water filter can be cleaned of debris by pumping water through said filter in a reverse direction.

It is a still further object of the invention to enable the mouthpiece section of the water purification device of the present invention to be fitted into the neck of a cup for holding potable water obtained through use of said device, and which cup device also serves as a cover for the pre-filter when the device is not in use.

It is a still further object of the invention to provide a water purification device of a portable type wherein the water can be pre-filtered by a filter having a very small pore size before entering the device, which pre-filter may treated with a nano silver layer to destroy or neutralize a greater number of bacteria and viruses in the water before the water has even passed into said device, and whereby the water is further passed through both a disinfecting agent and an activated carbon bed to provide complete purification.

It is a still further object of the invention to provide a portable water filtering device wherein a disinfecting agent is provided in the pre-filter whereby the pre-filter acts as a separate holding chamber in which the water may be isolated and treated with such disinfecting agent.

It is a still further object of the invention to provide a portable water filtering device wherein the supply of water is passed through a final nano-filtering stage.

It is a still further object of the invention to provide a portable water purification device wherein the water is disinfected and purified and in addition a containment area in which micronutrients can be added to the potable water is also provided.

Still other objects and advantages of the invention will become clear upon review of the following detailed description in conjunction with the appended drawings.

SUMMARY OF THE INVENTION

A portable device for filtering and purifying water to render such water potable for drinking is disclosed, comprising a manual pump device having a first chamber and a second chamber which is telescopingly slidable within the first chamber. A pre-filter through which contaminated water must pass before entering the first chamber is secured over the entrance to the first chamber. A disinfecting agent is preferably provided in a cavity in the pre-filter, thus both filtering and treating the water supply prior to entering the pump device. Once in the first chamber, the water is completely isolated and can be kept in such chamber for as long as necessary to be treated with a desired disinfecting agent, or alternatively treated as desired. After treatment in the first chamber, the water is next passed into the second chamber where it is further filtered and made potable, passing over an activated carbon bed and through a nano-filter apparatus. A protective cover preferably forming a container is provided over the outer surface of the pre-filter, which cover is also securable over the mouthpiece end of the device to collect filtered water. In use, with the pre-filter immersed in a water supply, the inner chamber is slid upwardly out of the holding chamber, creating a negative pressure in the first chamber which draws water through the pre-filter into such first chamber. The negative pressure allows the pre-filter to have a much smaller pore size than is possible with a conventional straw-type water filtering device. Then, the water is forced into the second chamber by a positive pressure created when the second chamber is slid back into the first chamber. The pre-filter, container, mouthpiece, and other parts of the device can be further treated with a nano silver coating, which destroys or neutralizes up to 98.6% of bacteria coming into contact with the coating. The pre-filter is also detachable from the end of the holding chamber and can be attached over the mouthpiece end of the inner chamber so that the filter device can be used to pass clean water through the pre-filter in a reverse direction, flushing accumulated contaminants and other debris from the filter, and extending the life of the pre-filter. A removable containment area in the inner chamber may also provided for adding micronutrients to the purified water prior to drinking. Additional chambers may be added to the device as required to treat particularly dirty water or water having special filter needs.

DESCRIPTION OF THE PREFERRED EMBODIMENTS

Figure 1:
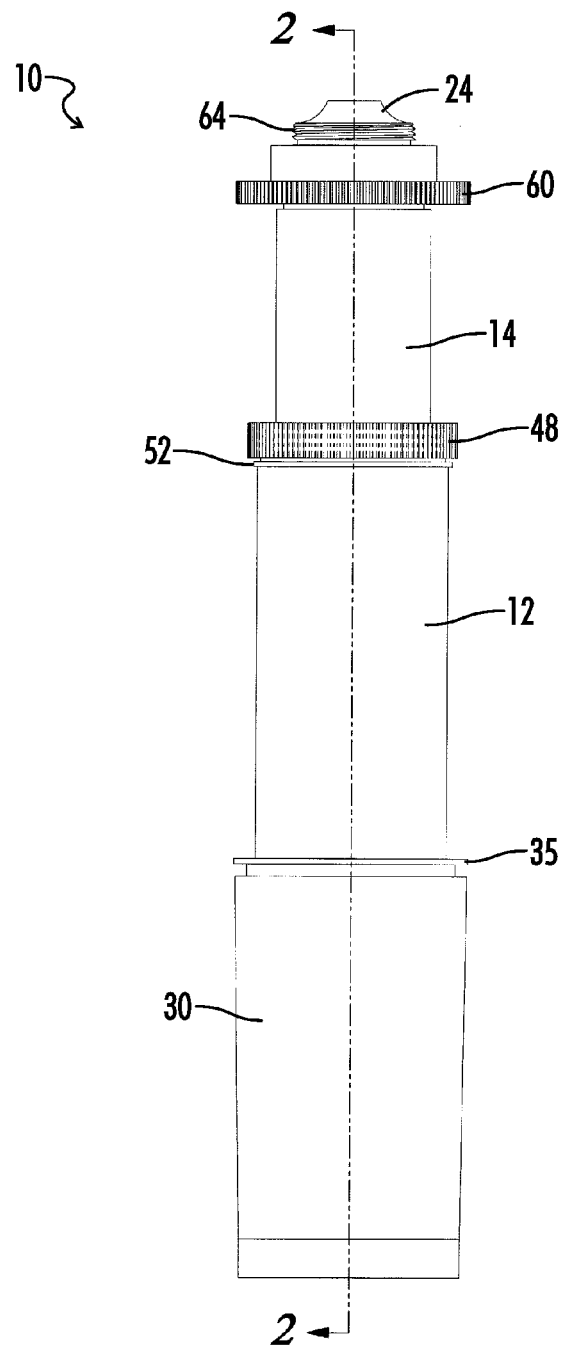
FIG. 1 is a side view of the water filtering and purifying device of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

The present invention is directed to a portable water disinfecting and purifying device capable of isolating an amount of water in a cavity in the pre-filter prior to entering into the device or in a first holding chamber where the water is treated with the appropriate disinfectant, and then is passed into a second chamber where it is further filtered and dispensed for drinking or any other desired activity. The second or inner chamber is telescoping with respect to the first holding or outer chamber, and with the distal end of the first holding chamber having a pre-filter attached being held in a supply of contaminated water, the second or inner chamber is moved outwardly of the first holding chamber, creating a negative pressure in the first holding chamber and drawing a volume of such water through the pre-filter and eventually through a one-way check valve into the first holding chamber. The water can be maintained in the pre-filter or first holding chamber for a desired time period to allow a disinfecting agent or agents to treat the water. Then, the inner chamber is moved telescopingly back into the first holding or outer chamber, which creates a positive pressure in the first chamber and causes the water to be forced through a one-way valve adjacent the lower end of the inner chamber and into such inner chamber. Once in the inner chamber, the water may be further treated by passing through a filter or filters, mixing with another disinfecting agent or otherwise being made potable. Preferably, the water is passed through at least one nano-filter.

By providing a filtering device that utilizes a pumping action, a significantly greater pressure and force is created which allows the device to be used to draw water through filters having much smaller pore sizes than is possible with any other known straw type water filtering devices, and in addition a separate holding chamber in which a disinfecting agent is applied to the water is provided. The present embodiment includes numerous additional improvements over prior art portable straw type devices. The present device includes a removable protective cover which in a storage arrangement is fitted over the pre-filter, but which can also be fitted over the mouthpiece on the opposite end of the device and can serve as a cup for capturing and storing or drinking the filtered water. In another improvement, the pre-filter and mouthpiece are detachable from the device and the pre-filter can be secured over the upper end of the inner chamber and clean water drawn through the device and across the pre-filter in a reverse direction, thereby solving the problem of clogged filters that is common in prior art devices. It has also been discovered quite unexpectedly that the pre-filter as well as other components of the device can be treated or coated with a nano silver solution which kills 98.6 percent of bacteria coming into contact with the coating, and as applied to the pre-filter before the contaminated water ever enters the device for further treatment. In another improvement, it has also been discovered that the protective cover/cup provided with the device can be made of polycarbonate, and when injection molded can be treated with the same nano silver solution, thereby subjecting water placed in the cup to further treatment. The device can also be used to deliver oral micronutrients such as important vitamins, minerals, as well as vaccines to those who consume the treated water supply. With these and other improvements that are described herein, the present inventor's portable water dispensing device represents a substantial advance in the art and brings new hope to those who are continually plagued by unclean and contaminated drinking water supplies as well as a new means for administering critical micronutrients to the undernourished and poor.

Reference will now be made in detail to several preferred implementations of the present invention as illustrated in the accompanying drawings. Wherever possible, the same reference numbers will be used throughout the drawings and the following description to refer to the same or like parts.

Figure 2:
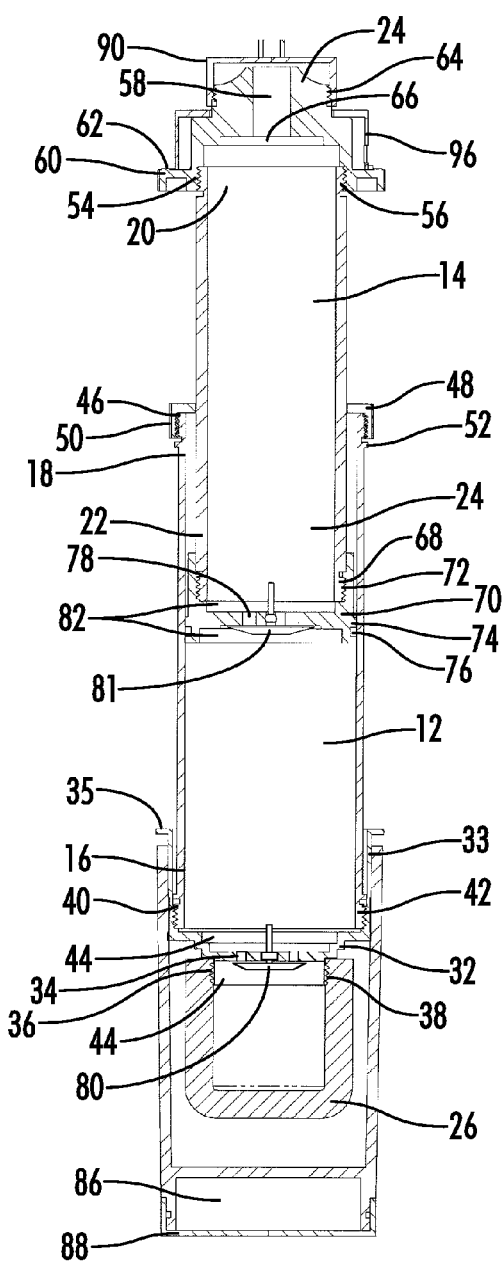
FIG. 2 is a cross-sectional view of the water filtering and purifying device of the present invention taken along line A-A in FIG. 1.
Figure 3:
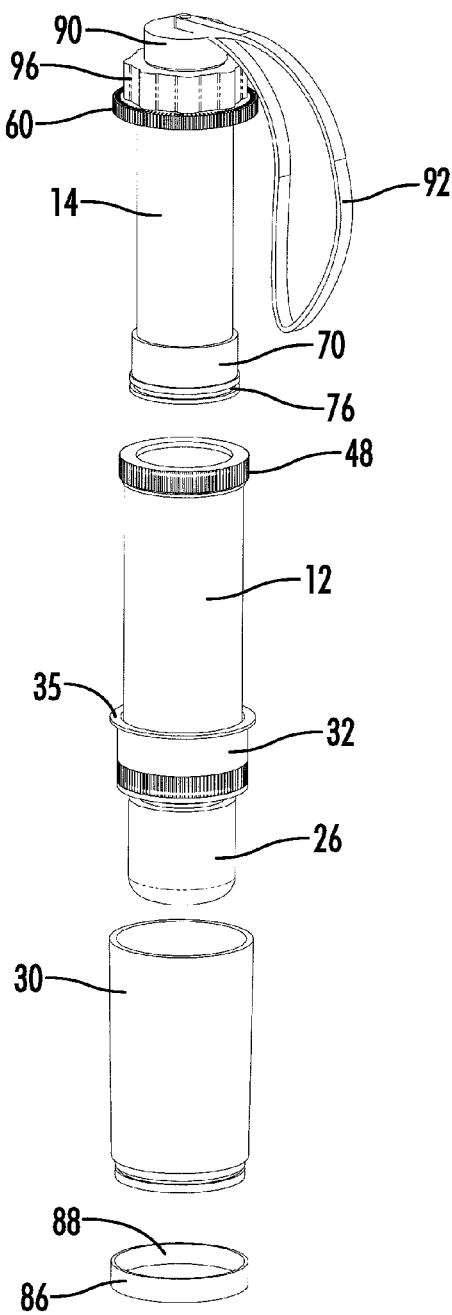
FIG. 3 is a partially exploded isometric view of water filtering and purifying device of the present invention.

Referring now to FIGS. 1-3, there is shown a preferred embodiment of the water purifying and filtering device 10 in accordance with the present invention. Device 10 is comprised primarily of an elongated outer holding chamber 12, an elongated inner chamber or receptacle 14 that is telescopingly slidable within said holding chamber 12 in an airtight manner, a mouthpiece 24, a pre-filter 26 (see FIGS. 2-3), and a combination protective covering and container 30. Holding chamber 12 has a distal end 16 and a proximal end 18; similarly, chamber 14 has an upper end 20 and a lower end 22. Holding chamber 12 and telescoping inner chamber 14 are preferably made of a thermoplastic polymer such as polypropylene and have a tubular or cylindrical configuration; however, chambers 12 and 14 could be made from other materials, and could be provided in other shapes such as rectangular while still falling within the scope and accomplishing the intended purposes of the invention. In addition, the dimensions of the chambers can be varied to accommodate a greater or lesser volume of water in each of the chambers, although it is primarily intended that the device be portable and carried conveniently on one's person in a duffel bag, shirt pocket or the like. Mouthpiece 24, which will be described in greater detail below, is connected to the upper end 20 of inner chamber 14, while pre-filter 26 (see FIG. 2) is secured over the distal end 16 of holding chamber 12. Protective cover 30 is provided over pre-filter 26, which cover 30 as will also be explained below serves as both as a cover and a container device for collecting drinking water that has been filtered using device 12.

Pre-filter 26 is attached to holding chamber 12 by sleeve 32, with threads 36 on the upper end of pre-filter 26 being engaged with matching threads 38 on the sleeve 32. A central bore or passageway 34 extends centrally through sleeve 32, and the sleeve is connected to the distal end 16 of holding chamber 12 by threads 40 which are engaged with matching threads 42 on the outer surface of distal end 16. A one-way check valve 80 is mounted in central bore 34 of sleeve 32, which check valve 80 allows aqueous solutions that are passed through pre-filter 26 to flow into distal end 16 of holding chamber 12 through passageway 34, but prevents liquids from flowing out of holding chamber 12 through distal end 16 via passageway 34. Sleeve 32 also includes a collar section 33 that surrounds the outer surface of the distal end 16 of holding chamber 12, ending at peripheral lip 35. As shown in FIG. 2, the inner surface of protective cover 30 frictionally engages with the outer surface of sleeve 32 up to lip 35 when the cover 30 is placed over the lower end of holding chamber 12. Pre-filter 26 can be made of various porous substances such as polyethylene or ceramic material, and has a pore size that prevents particulate matter, sediment and like larger contaminants from entering holding chamber 12, which would quickly clog the check valve 80, as well as smaller contaminants as will be explained in greater detail below. Spaces 44 are provided in passageway 34 in which porous filters are positioned to capture any particulate matter from inadvertently passing through the one-way check valve 80, which filters are positioned on each side of the check valve 80. In practice, however, due to the amount of suction generated by using device 10 in the manner described below to draw water through pre-filter 26 into holding chamber 12, pre-filter 26 may have a very small pore size such as thirty-five microns or smaller and still allow water to be easily drawn through such pre-filter into holding chamber 12, so that pre-filter 26 prevents both large and small contaminants from entering holding chamber 12. Additional advantages and uses of pre-filter 26 are discussed below.

Figure 4:
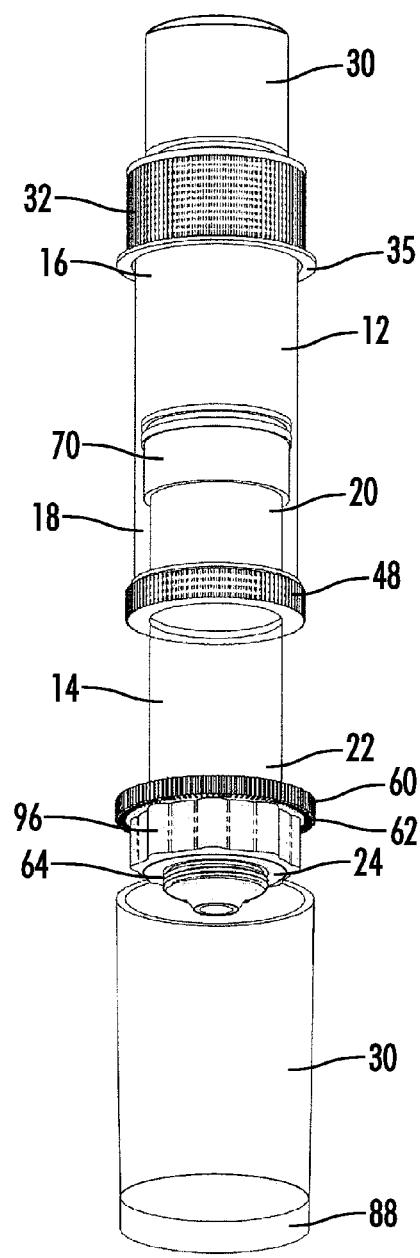
FIG. 4 illustrates the device in a position to dispense potable water into the container provided with the invention.

Threads 46 are situated on the outer surface of proximal end 18 of holding chamber 12, which threads are engaged with matching threads 50 on collar member 48, until the lower edge of collar member 48 is pressing against lip 52 on the outer surface of holding chamber 12. Collar 48 has a central orifice in which inner chamber 14 is slidingly received, so that such collar 48 in effect secures inner chamber 14 in a telescoping relationship with respect to holding chamber 12. Mouthpiece 24 is threadably secured to the upper end 20 of inner chamber 14 by threads 54 which engage with matching threads 56 on the outer surface on the upper end 20 of chamber 14. Mouthpiece 24 has an internal orifice 58 through which disinfected and purified water is passed out of device 10 as will be explained below, and also includes a peripheral lip sectional 60 which flares outwardly from the exterior surface of the mouthpiece. Peripheral lip 60 facilitates manual gripping of inner chamber 14 and telescopingly sliding such chamber 14 in and out of holding chamber 12, and in addition as shown in FIG. 4 the top surface 62 of lip 60 also serves as a surface for supporting device 10 in an upside down position resting on the rim of protective cover 30 when such cover is removed from the distal end 16 of holding chamber 12 and is used to collect the potable water as it exits through mouthpiece 24. Another threaded area 64 is provided on the outer surface of mouthpiece 24, which threads receive a cap member 90 that is securable over orifice 58 when device 10 is not in use to prevent dirt and other contaminants from entering device 10. Also, a space 66 is positioned adjacent the mouth of orifice 58 in chamber 14, in which opening a porous filter member is positioned to prevent filter material or the like from escaping inner chamber 14 through the orifice.

The outer surface of lower end 22 of inner chamber 14 is also threaded to secure end plug 70 to such end of the inner chamber, which threads 68 are adapted to receive matching threads 72 on end plug 70. End plug 70 has a peripheral rim section 74 having a notch 76 therein in which a sealing member such as a rubber ring or gasket is positioned, which gasket presses against the inner wall of holding chamber 12 and provides an airtight seal between the inner and outer chambers as the inner chamber 14 is slidingly moved in and out of holding chamber 12. Other arrangements known to those skilled in the art for providing an airtight fit between outer chamber 12 and inner chamber 14 may also be utilized. An internal passageway 78 is provided in plug 70, in which a one-way check valve 81 is secured and allows an aqueous solution to flow from holding chamber 12 into inner chamber 14 through passageway 78, but prevents the reverse flow of an aqueous solution from inner chamber 14 into holding chamber 12. Spaces 82 are also provided adjacent the mouth of passageway 78 preferably on either side of check valve 81 in which a porous filter is positioned to prevent any particulate matter from inadvertently passing through the one way valve.

As indicated above, contaminated water is forced to pass through pre-filter 26 into holding chamber 12 by the negative pressure created when inner chamber 14 is slid telescopingly out of holding chamber 12. Holding chamber 12 contains at least one disinfectant agent, so that the water drawn into holding chamber 12 is isolated and in contact with said disinfectant agent for the time period required for the particular agent or agents to destroy or neutralize specific bacteria, viruses and/or protozoa or other contaminants in the water. Device 10 may be gently shaken or twisted back and forth during such time period to ensure that the disinfecting agent completely mixes with the water in holding chamber 12 so that all of such water is properly contacted and sterilized or treated by the agent. A preferred disinfecting agent is an iodine resin comprised of a multitude of granules, which disinfecting agent may be provided floating free in holding chamber 12, or may be contained in a cartridge, permeable sack or other container. Once treated in holding chamber 12, the water is transported out of the holding chamber 12 into inner chamber 14 by forcibly moving inner chamber 14 back into such holding chamber. As shown in FIG. 4, device 10 may be turned upside down and then positioned with the top surface 62 of lip 60 of mouthpiece 24 resting against the rim of container 30, after which the user may push holding chamber 12 downwardly to cause inner chamber 14 to move back into such holding chamber 12. This causes the water in the holding chamber to be forced through the one-way valve 81 in plug 70 into inner chamber 14 and then out of device 10 through mouthpiece 24, where it is collected in container 30. In a preferred embodiment, container 30 may hold eight ounces of fluid. It should also be noted that collar section 33 of sleeve 32 has been specifically designed to cover the distal end 16 of holding chamber 12, so that the iodine resin in holding chamber 12 is blocked by collar section 33 from being subjected to direct sunlight when device 10 is not in use. Inner chamber 14 contains one or more filtering or purifying substances, one of which is preferably a granular activated carbon (GAC) bed or bacterialstatic agent, which may be either free floating in chamber 14 or housed in a separate filter device or container inserted in inner chamber 14 and preferably positioned adjacent mouthpiece 24. The activated carbon bed captures by adsorption virtually all remaining particulates in the aqueous solution. Thus, before liquid is passed out of mouthpiece 24 it is immersed in the disinfecting agent or agents in holding chamber 12, and then the purifying and/or filtering substances in inner chamber 14.

Many of the various parts described above comprising device 10 are detachable from one another and therefore can be cleaned or replaced with new parts as required. For example, mouthpiece 24, sleeve 32, and end plug 70 are each preferably threadably secured to the ends of chambers 12 and 14, and thus may be easily removed and as indicated above cleaned periodically or replaced if damaged as needed. In addition, sleeve 32 can be removed from the distal end 16 of holding chamber 12, enabling the disinfectant agents to be easily replaced or changed in such holding chamber 12. Similarly, end plug 70 may be removed from the lower end 22 of inner chamber 14 so the user can easily place the purifying substances in inner chamber 14 or change them as needed. Pre-filter 26 may also be removed and cleaned or replaced with a new pre-filter having either the same or a different pore size, depending on need and also on how dirty the water to be purified by device 10 appears. In some instances, the user may wish to use a pre-filter having a significantly smaller pore size where the water is visibly cleaner to pre-filter out a greater number of small particles, while if the water is extremely murky or dirty a pre-filter having a large pore size may be necessary at least initially to allow such water to more readily pass through check valve 80 without clogging, although as discussed below the pore sizes that can be effectively used with the present invention in any event are significantly smaller than other known straw-like water filtering devices.

Purification device 10 can accommodate filters or filtering substances having substantially smaller pore sizes, since unlike the conventional straw type water filtering devices known to the inventor, the positive and negative pressure generated by the inner chamber 14 being moved telescopingly in and out of holding chamber 12 respectively enables the water to be drawn across such small pored filters, and thus the present device is much more effective in removing microbial contaminants to ensure that the water is potable. Other known straw type water filtering devices cannot be used to pass a suitable supply of water through a pre-filter or one or more internal filters having a sufficiently small pore size solely by suction or reverse pressure applied by the mouth of the user placed on a mouth piece and exerting a sucking action. With the present inventor's purifying device 10, however, when pre-filter 26 is held or lowered into a contaminated water supply, the water is easily drawn into holding chamber 12 in reaction to the suction or negative pressure created in such holding chamber as inner chamber 14 is moved upwardly out of holding chamber 12. Then, when inner chamber 14 is moved back into holding chamber 12, the resulting positive pressure forces the water to pass through a one-way check valve 81 into inner chamber 14, and then through one or more purifying substances such as an activated carbon bed before exiting through mouthpiece 24. Upon initiating use of device 10, inner chamber 14 will be in a retracted position inside holding chamber 12, cover 30 is removed, and pre-filter 26 is inserted in a supply of water to be filtered or purified, which water may be from a lake, stream, or other treated or untreated source. Preferably, such water will be as free of visible contaminants as possible, and may be initially strained through a cotton shirt or cloth or the like into a clean container to remove most very large or easily visible contaminants. Then, as indicated above, while pre-filter 26 is maintained in such water supply, inner chamber 14 is manually slid upwardly out of the proximal end 18 of holding chamber 12, which movement creates a suction and the water is caused to be pulled through pre-filter 26 into the holding chamber 12 through the passageway 34 in sleeve 32. After the water isolated in holding chamber 12 is treated for the desired length of time, inner chamber 14 is then urged back into a retracted position inside holding chamber 12, either as shown in FIG. 4 or with one's mouth on mouthpiece 24. As inner chamber 14 is urged back into holding chamber 12, water in the holding chamber 12 is prevented from exiting through passageway 34 in sleeve 32 in the distal end 16 of the holding chamber by a one-way check valve 80, and thus is forced to enter inner chamber 14 through the passageway 78 in plug 70. Eventually, sufficient water has passed into inner chamber 14 so that it is substantially filled, and the positive pressure is great enough to force such water across any filters and purifying substances in inner chamber 14 and out mouthpiece 24.

As best shown in FIGS. 2 and 3, protective covering 30 may also have a storage compartment 86 in its lower end, in which spare supplies such as a new supply of iodine resin (1 tablespoon) or other disinfectant agent may be stored in space 88. Storage compartment 86 is securable to protective covering 30 by a suitable means such as a threaded lid arrangement or a frictional fit.

A drawback found in prior art portable water filtering devices is that the pre-filter quickly becomes clogged with contaminants that are captured in such pre-filter, and unless such contaminants are removed, or a new pre-filter is provided to replace the clogged pre-filter, the device is quickly rendered ineffective. The present inventors' have thus provided as part of the present device an improved arrangement for quickly and simply flushing contaminants out of the pre-filter, thereby substantially unclogging and cleaning the pre-filter and restoring its usefulness. More particularly, device 10 is arranged so that pre-filter 26, which as indicated above is detachably secured to sleeve 32 by threads 36, can be removed from sleeve 32 and secured by the same threads 36 to mouthpiece 24 via threads 64 on the outer surface of the mouthpiece. In such position, clean water is passed through device 10 and pre-filter 26 in the manner described above for filtering such water, which water after passing through mouthpiece 24 passes into pre-filter 26 is a reverse direction. The force of the reverse water flushing through pre-filter 26 causes most of the contaminants that have been caught and accumulated in pre-filter 26 near its outer surface to be flushed out of the pre-filter material, thereby unclogging the pre-filter so that it can again be secured to sleeve 32 on the distal end 16 of holding chamber 12 and device 10 used in the manner described above. It has been found that clean water only needs to be pumped through pre-filter 26 in a reverse direction as just described a limited number of times before such pre-filter is substantially unclogged. The presently described arrangement in effect will extend the life of the main pre-filter indefinitely, as it can be repeatedly cleaned and reused with device 10 in the manner just described. Of course, when the pre-filter 26 is being cleaned or unclogged in such manner, a substantially clean source of water should be passed through the pre-filter. In addition, the pre-filter may be dipped in a bleach solution or the like as described above to ensure that any remaining potentially harmful microscopic organisms in the pre-filter are killed. If the pre-filter is cleaned as just described using water from an impure source or that might contain further contaminants, once the pre-filter is again secured to the end of holding chamber 12 and mouth piece 24 threadably secured to inner chamber 14, ideally a few units of clean water should be pumped through the filtering device and out of mouth piece to try to kill or flush any potentially harmful substances that may have accumulated on the surface of the mouth piece or interior surface of the pre-filter prior to consuming such water.

Figure 6:
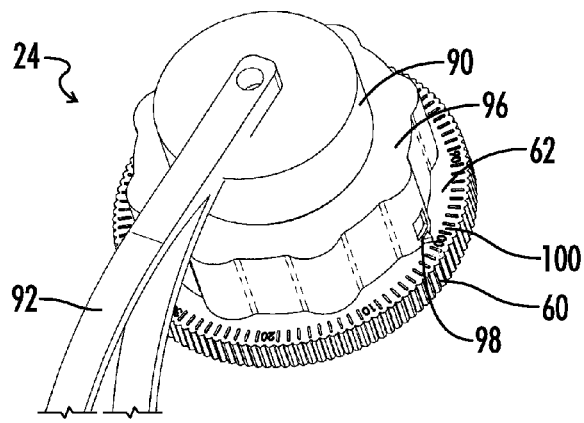
FIG. 6 is a closeup view of the mouthpiece section of the device of the invention.
Figure 5:
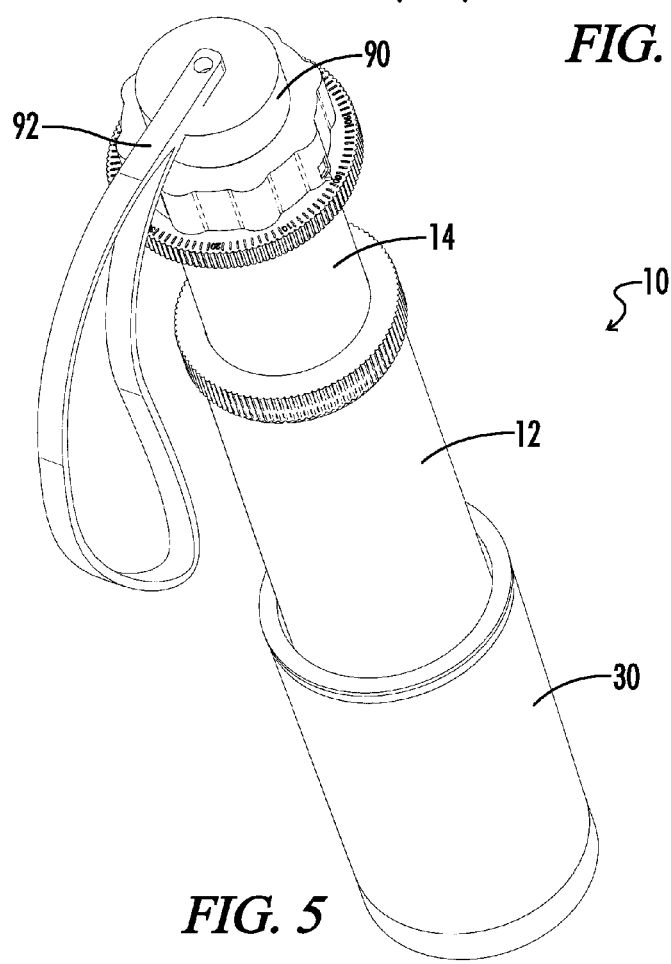
FIG. 5 is a top isometric view of the water filtering and purifying device of the invention.

In addition, mouthpiece 24 includes a removable cap 90 which is threadably secured to threads 64 on the outer surface of mouthpiece 24 (see FIG. 2), and which cap 90 also has a wrist strap 92 connected thereto. A shallow longitudinal vent or slot (not shown) is also preferably provided on the outer surface of mouthpiece 24, which serves as an outlet for air to escape from drinking container 30 when the device as best illustrated in FIG. 4 is placed on container 30 with mouthpiece 24 extending downwardly into container 30, and water poured in container 30 from device 10 replaces the air in such container. In addition, another small air hole or vent (not shown) may be provided extending through mouthpiece 24 adjacent orifice 58, which hole enables mouthpiece 24 to be pressed tightly into the mouth of a conventional plastic water bottle or canteen having a narrow mouth to prevent spilling of the water, whereby the air in the bottle that is replaced by the water can flow though such air hole. Mouthpiece 24 will also preferably be dipped in a nano silver solution, which will render the surfaces of the mouthpiece bacterial static, using a process that is explained in greater detail below. As shown in FIGS. 5 and 6, a rotatable counter or dial 96 is preferably secured around the outer surface of mouthpiece 24 adjacent top surface 62 of peripheral lip 60. Dial 96 includes an arrow 98 which indicates the position of the dial, and in addition the top surface 62 of peripheral lip 60 includes sequential tally or counter markings 100. The dial and counter markings are provided as an aid to the user in keeping track of the number of times a volume of contaminated water has been passed through device 10, and also for tracking when the disinfectant agent in holding chamber 12 should be changed or pre-filter 26 should be flushed out. The counter arrangement although simple in structure is important to the proper use of device 10, since if the device is being used with a diluted or insufficient quantity of disinfecting agent, or the pre-filter or other filters are not cleaned regularly, operation of the device and its overall effectiveness obviously may be seriously comprised.

Figure 7:
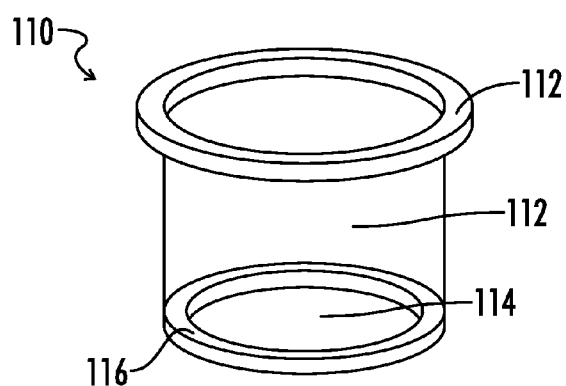
FIG. 7 is a perspective view of the separable containment device provided with the device of the present invention.
Figure 8:
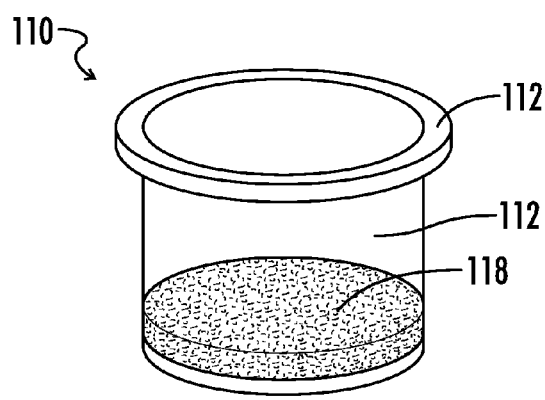
FIG. 8 is a perspective view of the containment device shown in FIG. 7 having a filtering disc therein.

In addition to filtering and providing a source of potable drinking water, it has also been found by the present inventors that many different vitamins or other nutrients can be added to the water. Thus, not only will device 10 provide a source of potable water, it will also serve as a source of micronutrients, which are lacking in a large majority of the population of the world. Common minerals that are deficient in large numbers are iron, magnesium and potassium, specifically with respect to the millions of malnourished people around the world, as well as a number of vitamins such as Vitamin C and Vitamin D. In addition, electrolytes can be added to the potable water supply as a guard against dehydration due to both physical exercise and dysentery. To dispense such micronutrients using device 10, the micronutrients are preferably first placed in a separate containment structure 110, shown in FIGS. 7 and 8, having a holding area 112 with an orifice 114 in its bottom surface 116 on which a filter or screen 118 is positioned, through which dissolved micronutrients can pass, and a lip 120 on its upper edge that fits over either the lower end 20 or upper end 22 of inner chamber 14, or alternatively may be dimensioned to fit tightly against the inner walls of chamber 14. Containment structure 110 may hold further purifying substances through which the water in device 10 is to be passed, or may also contains medicines such as vaccines or the like to be dispensed by the device.

Figure 9:
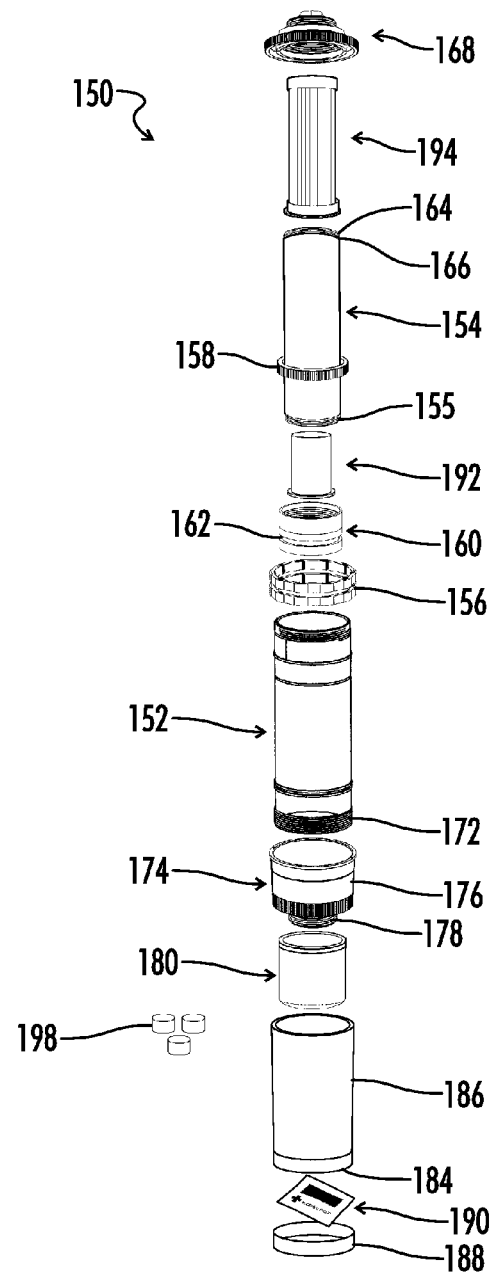
FIG. 9 is an exploded view of another embodiment of the present invention.

FIG. 9 is an exploded view of another alternative embodiment of the portable water filtration and purification device 150 of the present invention. Similar to the previous embodiments, device 150 includes an outer chamber 152, and an inner or plunger chamber 154 which is telescopingly slidable in outer chamber 152. Threads 156 are provided on the outer surface of the upper end of outer chamber 152, which are received by matching threads on locking ring 158 which is slidable around the outer surface of inner chamber 154 and prevents inner chamber 154 from being completely detached from outer chamber 152. Piston 160 having a gasket 162 on its outer surface is threadably secured to the lower end of inner chamber 154 having a gasket 155 which provides an airtight seal between the outer and inner chambers. Threads 164 are similarly provided on the upper end of inner chamber 154, with gasket 166 positioned at the bottom neck area of such threads, for threadably receiving matching threads on removable mouthpiece 168. Counter rings 170 are provided on the outer surface of outer chamber 152, which rings contain spaced apart numbers and are rotatable so that the counter rings 170 can be used to keep track of the number of uses of device 150, the number of times a particular filter has been used, or the like. Threads 172 are also provided on the lower end of outer chamber 152, with a gasket 173 also situated at the upper neck end of such threads, which threads are adapted to receive matching threads on base cap 174, which base cap 174 includes a cover section or shroud 176 that extends upwardly over the outer surface of the lower end of outer chamber 174. Base cap 174 also includes a lower male threaded section 178 with a gasket at the end of the threads, which threads 178 are adapted to receive matching female threads on ceramic pre-filter 180. A drinking cup or container 184 is also secured to base cap 174 by a friction fit. Drinking cup 184 also contains a pocket 186 in base section 188 in which a sterilization swab 190 may be stored, with base section also 188 being threadably secured to the lower end of cup 184.

A screen and one way valve are provided in a central aperture in base cap 176 which is secured to the lower end of outer chamber 152; similarly, a screen and one way valve are also provided in piston 160 secured to the lower end of inner chamber 154. In addition, a cover (not shown) is removably secured over the upper end of mouthpiece 168. In a preferred embodiment, inner chamber 154 contains two filter members. Situated on the lower end of inner or plunger chamber 154 is a replaceable charcoal or activated carbon cartridge 192, and provided along the upper end of inner chamber 154 adjacent mouthpiece 168 is nano-filter 194. Nanofilter 194 is preferably a nano-alumina particle filter paper, and a suitable nano-alumina particle filter is manufactured and sold under the trademark NANOCERAM® by Argonide Corporation of Stanford, Florida, which filter paper is pleated and can be rolled up similar to a cigarette filter and inserted in the orifice in mouthpiece 42. As water flows through the nano-alumina filter, an electrical charge is generated which attracts and captures any particles or other contaminants remaining in the water. The pleated NanoCeram® filter may also include a layering of activated carbon powder to collect such things as cryptosporidium cysts as well as reduce organic material in the water prior to reaching the disinfecting chamber. The nano-membrane captures positively charge particles, such as bacteria, viruses, and other contaminants in the liquid.

In addition, also provided with device 150 is a disinfecting agent 198, which disinfecting agent is placed in an inner cavity in pre-filter 180. Disinfecting agent 198 is preferably a slow dissolving high parts per million purification tablet of chlorine or bromine that mixes with the water after it has passed through pre-filter 180 into the inner cavity, and quickly mixes with and kills viruses and bacteria in such liquid. In addition, as described in greater detail below, the purifying agent 198 remains mixed with the liquid after it exits pre-filter 180 and travels into outer chamber 152. As a result, such liquid is then subjected to chlorine or bromine purification treatment for a longer period in outer chamber 152, which chamber may be shaken several times to ensure complete mixing of the disinfecting agent with the water, for a time period that will be at a minimum equal to or greater than the required exposure time to kill viruses. Furthermore, as indicated with reference to the previously described embodiments, one or more of the individual components of device 150 may be dipped in or coated with a nanosilver solution, making such components effectively bacteriostatic. It is also noted that while the water may be drawn inwardly through the pores of polyethylene pre-filter 180, the liquid in the inner cavity of pre-filter 180 immersed in disinfecting agent cannot pass outwardly in a reverse direction through pre-filter 180, as the pores are too small for the liquid to pass without additional force or pressure. Pre-filter 180 in one embodiment is a 70 micron polyethylene filter.

In use, first the sterilization swab 190 is used to clear the inside of cup 184 and the top of mouthpiece 168. White pre-filter 180 is then completely submerged in the water source, and inner chamber 154 is drawn upwardly out of outer chamber 152, which creates a negative pressure in outer chamber 152 as well as in pre-filter 180, drawing water inwardly through pre-filter 180 and eventually into outer chamber 152. The water is then immersed in disinfectant agent 198 in the inner cavity of pre-filter 180, which solution is drawn upwardly through a one-way valve in base cap 174 into outer chamber 152. After a desired amount of water has been drawn into outer chamber 152, device 150 is then preferably turned upside down and the mouthpiece is positioned so it is now resting on the rim of glass 184. Inner chamber 154 is then pushed downwardly back into outer chamber 152, which causes the liquid to be pass through the one way valve in piston 160 into the inner chamber 154. Here, the liquid must pass across two separate filters, charcoal or activated carbon filter 192 and the post filtration NanoCeram® nano-filter 194, which together remove the disinfecting agent and any other remaining contaminants from the liquid. More particularly, test results indicate that the activated carbon reduces the chlorine from shock levels of about 25-55 ppm (parts per million) to about 2.5 ppm (parts per million). The EPA (Environmental Protection Agency) standard for chlorine parts per million in drinking water is 3 ppm. By adding the NanoCeram post filter in addition to passing the liquid through an activated carbon filter, thus it has been found the amount of chlorine can be reduced to below 0.3 ppm (parts per million), or "non detectable" levels, which also as a result greatly improves the taste of the water. The nano-filter media provided as a post filter also mechanically removes cysts, and in fact it has been found through testing that the performance actually improves as the filter becomes clogged through usage. Other post filter media accomplish this within this device. It is also noted that rim 176 of base cap 174 protects the liquid in outer chamber 152 which is immersed in the disinfecting agent from UV light.

Another important feature of the present invention is the size of the hole in mouthpiece 168, which while variable depending on the dimensions of chambers 152 and 154, may be sized to restrict the flow of liquid out of device 150 so that the proper contact time of the liquid in the disinfecting agent in outer chamber 152 is effectively ensured. Pre-filter 180 may hold a volume in its inner cavity or chamber in one embodiment approximately 45 ml, which is a sufficient quantity to ensure that the water is properly "shocked" with the disinfecting agent as it passes through such pre-filter and in outer chamber 152. A proper contact time, for example, in one embodiment using a slow dissolving chlorine tablet is approximately forty five seconds. In addition, as mentioned above with a seventy micron polyethylene pre-filter pore size, the liquid is easily drawn or pulled through such filter into device 150 upon exertion of the negative pressure created by device 150 upon pulling inner chamber 154 out of outer chamber 152, but under normal atmospheric pressure conditions the liquid in pre-filter 180 will not pass or drip out of such filter. The gutter or rim 182 around male threaded section 178 of base cap 176 is provided to catch any contaminated water that may be on the outer surface of pre-filter 180 as the device is utilized or turned upside down, to prevent any further inadvertent contamination.

In another improvement, an additional pre-filter cover which fits tightly over the pre filter itself may be provided. Such cover eliminates any chlorine odors from contaminating container or cover 184 when it is desired to be used as a drinking glass. Furthermore, while as described above the dissolving chlorine disinfecting tablets 198 are placed in the inner cavity of pre-filter 180, the tablets may also be placed in outer chamber 152. One advantage of this is that the tablets are visible without having to remove the pre-filter and thus can be easily inspected visually for wear and dissolve rates. In addition, such arrangement also enables the device to be used the pre-filter, which may be desirable in certain instances such as, for example, when the device is being used to purify a supply of initially clear water such as from a hotel tap when traveling or a home when contamination is suspected.

A key improvement of the present inventors' portable water filtering device is the ability to filter out the vast majority of contaminants at a preliminary stage via a pre-filter, as well as a disinfecting agent, so that any water entering the device to be further treated has already passed through pre-filter and thus is significantly free of contaminants before entering holding chamber. Through experimentation, the present inventors have also found that pre-filter, which is preferably made from a porous polyethylene material of a type known to those skilled in the prior art and which is available from numerous sources, can have a pore size of thirty-five microns or less, small enough to filter out most contaminants. In addition, as indicated above the present inventors have found that adding a layer or coating having a thickness of about six ten millionths of an inch and containing nano silver particles having a size of approximately ten silver atoms can be applied to the surface of pre-filter. In a preferred arrangement, to apply the nano silver particle coating, the pre-filter is dipped in an isopropyl alcohol solution containing five hundred parts per million of such nano silver particles for a few second. When removed from the solution, the alcohol evaporates quickly and the silver particles are caught or adhered in the pre-filter. Due to the small size of the silver particles in relation to the pore size of the pre-filter, both the inside and outside of the pre-filter are coated with such silver particles. It is well-known that silver ions can be used to kill or destroy bacteria; however, by applying the nano silver solution to the inventors pre-filter, the inventors tests have found that approximately ninety-eight point six percent of the bacteria and viruses that come into contact with the particles while passing through the pre-filter are neutralized or destroyed before they enter device. The nano silver coating also extends the life of an iodine impregnated resin when used as the disinfectant agent in holding chamber, since the iodine is demand-released from such pellets. In another arrangement, both iodine and arsenic resins are provided in holding chamber, which disinfectants it has been found do not react together, and neutralize any cysts in the water electrochemically. In another improvement, the present inventors have discovered that the nano silver solution can be impregnated in the polycarbonate container during injection molding of such containers, so that any bacteria in water poured into the container and coming into contact with the nano silver particles exposed on the inner surface of the container will be destroyed. The nano silver particles may also be applied to the surfaces of other parts of device, such as mouthpiece, and container or drinking glass. The polyethylene filters placed over the ends of inner chamber 14, in filter 118 of micronutrient dispensing container 110, or at other positions in device 10, such as other divisions that are used to hold the purifying substances in chamber 14 or to compartmentalize the granulated activated carbon in such chamber, are also preferably treated with such nano silver solution, to maximize the bacteria kill rate of the invention as a whole as the water is passed through device 10.

Figures 10, 11:
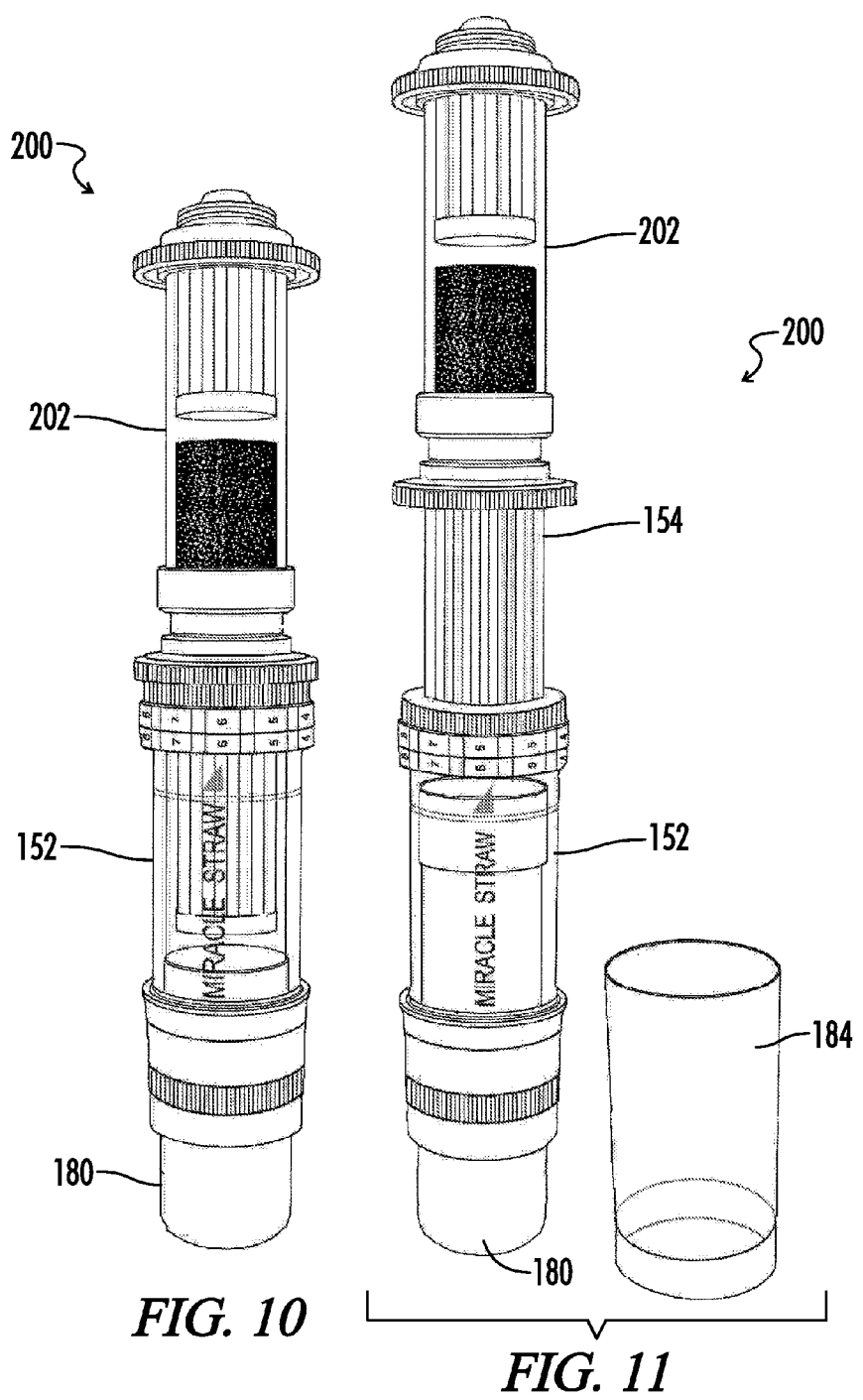
FIG. 10 illustrates another embodiment of the present invention in a contracted configuration.
FIG. 11 illustrates the embodiment of the present invention shown in FIG. 10 in an expanded configuration.

FIGS. 10 and 11 illustrate another embodiment of the present invention wherein, as an additional feature, a second chamber 202 may be threadably connected to the end of either outer chamber 152 or, as shown in FIGS. 10 and 11, inner chamber 154, to provide additional space of room for another filter or purifying agent to be added to device 200. Such extension tube may be desirable when the device is to be used to filter brown water containing tanic/humic acid. The additional chamber may contain another NanoCeram® filter, and overall aids in extending the life of the downstream filters to prevent premature clogging.

The main advantages of the presently described embodiment should be obvious, in that due to the greater amount and negative and positive pressure created by the pumping action of the device, pre-filter 26 may have a very small filter size while still enabling sufficient quantities of water to be moved through the device and purified, and thus a larger number of contaminants are kept out of device 10. In addition, the water can be isolated in holding chamber 12 and subjected to a disinfecting agent, and then passed into inner chamber 14 and filter through a granulated activated carbon bed or other bacterialstatic agent before being passed out of mouthpiece 24 as a potable water supply. The addition of cover/container 30 which not only protects pre-filter 26 but also serves as a drinking cup and storage area for resins, as well as the ability to quickly remove pre-filter 26 and attach it to mouthpiece 24 to reverse flush water through the pre-filter and unclog its pores further improves the usability of device 10. Application of a nano silver coating on the pre-filter 26 also not only destroys a large number of bacteria before the water supply even enters device 10, but also extends the life of the demand release disinfectant agent resins in holding chamber 12, thereby greatly extending the useful life of the resin and device, while the counter device provided on the mouthpiece serves as a visual indicator of when such resins and granulated carbon agents should be changed, or the device completely cleaned when possible. Other improvements and changes to the present device are also contemplated. For example, device 10 may be provided in a plastic storage container, which can also serve as a larger water storage compartment when necessary. In addition, the device may be accompanied by a separate soft style storage pouch that protects it from being damaged by blunt forces as well as sun damage caused by prolonged exposure to direct sunlight.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

We claim:

1. A portable water purification apparatus comprising:
   (a) a first chamber into which water to be purified may be drawn through an entrance by negative pressure and isolated for immersion in a disinfecting agent,
   (b) a second chamber slidable within the first chamber, said second chamber having an outlet and an inlet through which water in the first chamber is transferred by a positive pressure,
   (c) a pre-filter connectable to said apparatus such that water to be purified is passed through said pre-filter prior to entering the first chamber through said entrance, said pre-filter alternatively connectable over the outlet of the second chamber so as to enable clean water to be passed through the pre-filter in a reverse direction to aid in removing debris and contaminants from said pre-filter so that the pre-filter can be reused,
   (d) at least one micro-filter provided in said second chamber through which water is passed prior to exiting the second chamber through said outlet, and
   (e) a container securable over the pre-filter when the purification apparatus is not in use, said container also being usable to receive and collect potable water passed through said apparatus.

2. A portable water purification apparatus in accordance with claim 1 in which the pre-filter is comprised of a porous polyethylene material having a pore size of about thirty-five microns or less.

3. A portable water purification apparatus in accordance with claim 1 additionally comprising a mouthpiece securable over the outlet to the second chamber for directing water forced through the micro-filter into the mouth of the operator of the apparatus or into a storage container.

4. A portable water purification apparatus in accordance with claim 1 wherein the second chamber is slideable within the first chamber to provide both an initial negative pressure at the entrance to the first chamber for drawing water into the first chamber as the second chamber is withdrawn partially from the first chamber and to provide positive pressure in the second chamber as such first chamber is returned into said second chamber.

5. A portable water purification apparatus in accordance with claim 4 in which appropriate check valves are provided at the entrance to the first chamber and inlet to the second chamber to allow passage of water in only one direction from the pre-filter into the first chamber and the first chamber into the second chamber, but not in the reverse direction.

6. A portable water purification apparatus in accordance with claim 5 in which the first and second chambers are in the form of close fitting tubular elements with the second chamber in sliding engagement with the first chamber and additionally comprising a flexible gasket on the outer surface of the inlet end of the second chamber to provide an airtight seal between the first and second chambers.

7. A portable water purification apparatus in accordance with claim 6 wherein the walls of the tubular elements are transparent or translucent to allow the operator to monitor the internal operation.

8. A portable water purification apparatus in accordance with claim 1 in which the pre-filter additionally comprises an internal cavity for housing a disinfecting agent in which water passed through the pre-filter is immersed prior to entering the first chamber.

9. A portable water purification apparatus in accordance with claim 1 additionally comprising a disinfecting agent provided within a section of the second chamber.

10. A portable water purification apparatus in accordance with claim 1 additionally comprising a separable containment area in the second chamber in which micronutrients or other desirable additives may be combined with the resulting potable water.

11. A portable water purification apparatus in accordance with claim 1 additionally comprising a counter arrangement for tracking the number of uses of said apparatus and as an aid to determining when at least one disinfectant agent, purifying substance, or filter used with the apparatus should be replaced with a new supply of said agent, substance, or filter.

12. A portable water purification apparatus in accordance with claim 1 additionally comprising a storage compartment in said container.

13. A portable water purification apparatus in accordance with claim 12 in which the at least one micro-filter in the second chamber includes an activated carbon filter and a nanofilter.

14. A portable water purification apparatus in accordance with claim 1 in which one or more additional chambers through which water to be made potable by said apparatus is passed are connectable to either the first or second chambers for holding either another filter or a purifying agent.

15. A portable water purification apparatus in accordance with claim 8 in which disinfecting agent to be placed in said pre-filter internal cavity is chlorine at concentrations of between 25-55 ppm for the appropriate disinfecting time period.

16. A portable water purification apparatus comprising:
(a) an elongated outer chamber, said chamber having an entrance through which water enters said outer chamber by negative pressure, and an exit,
(b) an elongated inner chamber telescopingly slidable within the outer chamber in an airtight manner, said inner chamber having an inlet into which water in the first chamber is transferred by a positive pressure upon exiting said outer chamber through said exit, and an outlet,
(c) appropriate one-way check valves provided at the entrance to the outer chamber and inlet to the inner chamber to allow passage of water in only one direction into the outer chamber, and from the outer chamber exit into the inner chamber inlet, but not in the reverse direction, and allowing water to be isolated in said outer and inner chambers,
(d) a pre-filter connectable to said apparatus through which water to be purified is passed prior to entering the outer chamber through said entrance, said pre-filter alternatively connectable over the outlet of the inner chamber so that clean water passed through said apparatus and said pre-filter will flush debris and contaminants from said pre-filter,
(e) at least one nano-filtering device in said inner chamber through which water is passed prior to exiting through said outlet, and
(f) a combination protective covering and container securable over the entrance to the outer chamber and alternatively usable to collect water passed through said apparatus.

17. A portable water purification apparatus in accordance with claim 16 additionally comprising a sleeve attachable to said outer chamber having a central passageway forming the entrance to said outer chamber and supporting the one-way check valve at the entrance to the outer chamber, and a collar section to which the pre-filter is securable.

18. A portable water purification apparatus in accordance with claim 17 additionally comprising a collar member secured to said outer chamber having a central orifice in which the inner chamber is slidingly received, and an end plug securable to said inner chamber which supports the one-way check valve over the inlet to the inner chamber.

19. A portable water purification apparatus in accordance with claim 18 additionally comprising a mouthpiece securable over the outlet end of the inner chamber, said mouthpiece having an internal orifice in communication with the outlet of the inner chamber, said mouthpiece adapted to be received in said combination protective covering and container when used to collect water passed through said apparatus.

20. A portable water purification apparatus in accordance with claim 19 in which the pre-filter additionally comprises an internal cavity for housing a disinfecting agent to be mixed with water prior to entering the outer chamber.

* * * * *